May 6, 1969    D. H. HANSEN    3,442,567
OPTICAL REFLECTOR TARGET
Filed March 18, 1966

INVENTOR.
Donald H. Hansen
BY
Irving M. Kriegsman
ATTORNEY

United States Patent Office 3,442,567
Patented May 6, 1969

3,442,567
OPTICAL REFLECTOR TARGET
Donald H. Hansen, Williamsville, N.Y., assignor to The Perkin-Elmer Corporation, Norwalk, Conn., a corporation of New York
Filed Mar. 18, 1966, Ser. No. 535,433
Int. Cl. G02b *17/00, 27/30*
U.S. Cl. 350—50      6 Claims

ABSTRACT OF THE DISCLOSURE

An optical target constructed so that a beam of collimated light impinging thereon at one angle is returned at a proportionately different angle. The target is made up of a planar mirror and two positive lenses having different focal lengths. The lenses are positioned relative to each other and the mirror so that the optical path from one lens to the mirror and back to the other lens is equal to the sum of the focal lengths of the two lenses. The ratio of the angle of impinging beam to the angle of the returned beam is proportional to the ratio of the focal lengths of the two lenses.

---

The present invention relates to optical reflectors. More particularly, the present invention relates to an optical reflector which can be used as a target with optical instruments that measure angular deviations.

Optical instruments for measuring the angular position of an object such as, for example, autocollimators or theodolites are well known in the art. Generally, when using these instruments a flat mirror type of target is mounted on the object whose angular position is being monitored. A beam of collimated light sent out but the instrument strikes the mirror and is reflected back at an angle equal to its angle of incidence. If the object is relatively close to the instrument, very small angular changes are often difficult to read. On the other hand, if the object is at a relatively large distance from the instrument, large angular changes cannot be measured because of the location of the returned beam. These difficulties are due at least in part to the fact that the target reflects the light at the same angle as the angle of incidence.

Accordingly, it is an object of the present invention to provide a new and improved optical reflector which may be used as a target with angle measuring instruments.

It is another object of the present invention to provide a new and improved optical target which will extend the acquisition range of angle measuring instruments.

It is still another object of the present invention to provide a new and improved optical target which is particularly useful in measuring small angular changes.

It is yet still another object of the present invention to provide a new and improved optical target for use in extending the operating distance of standard autocollimators.

It is another object of the present invention to provide for a new and improved optical target which will return an incident beam of collimated light at an angle proportionally different from its angle of incidence.

The above and other objects are achieved by constructing a target according to this invention. Briefly, the target comprises in optical alignment two positive powered components having different focal lengths and a plane mirror. The two components are disposed in front of the plane mirror and positioned relative to each other and the mirror so that the optical path distance from one of the components to the mirror and back to the other component is equal to the sum of their two focal lengths. Thus, a beam of collimated light on striking one of the components will come to focus at the focus of the other component and then emerge from said other component. Because the two components have different focal lengths, a beam of light incident on one of the components will emerge from the other component at a proportionately different angle, the proportion being equal to the ratio of their focal lengths.

In one embodiment, the target comprises a mirror positioned in optical alignment with a pair of positive lenses having different focal lengths. The lenses are in the same plane and the mirror is positioned so that it is midway between their focal planes. If the incident beam of light is sized so that it enters both lenses, a pair of beams will be returned, one of the beams emerging through each lens.

Other objects and many attendant features of this invention will become readily appreciated as the same becomes better understood through reference to the following detailed description when considered in connection with the accompanying drawing in which like numerals designate like parts throughout the figures and wherein.

Figure 1:
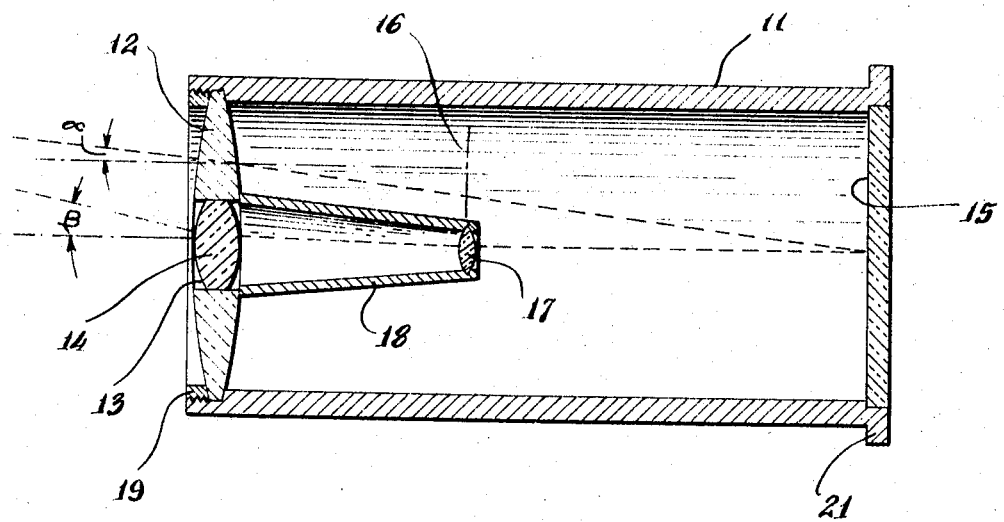
FIGURE 1 is a section view of one embodiment of the invention.

Referring now to FIGURE 1, there is shown a hollow tubular housing or annulus member designated by reference numeral 11. Rigidly mounted at one end of the housing is a first positive lens 12. Lens 12 is provided with a recessed portion 13 along its optical axis. Mounted within the recessed portion 13 and in optical alignment with lens 12 is a second positive lens 14. Lenses 12 and 14 are positioned in the same plane. The second lens 14 has a focal length which is different from the focal length of first lens 12. Rigidly mounted at the other end of the housing 11 is a plane mirror 15. The mirror 15 is located in a plane normal to the above mentioned optical axis. The mirror 15 is spaced from the lenses 12 and 14 so that a beam of collimated light striking lens 12 will come to focus at the focus of lens 14. This spacing is achieved by positioning the mirror 15 midway between the focal planes of the two lenses. Insofar as the distance from the lenses 12 and 14 to the mirror 15 is equal to one half of the sum of the focal lengths of each of said lenses. However, it should be noted that lenses 12 and 14 need not lie in the same plane, it only being necessary that the total optical path length from one lens to the mirror to the other lens be equal to the sum of the two focal lengths. If the two lenses do not lie in the same plane the mirror is simply positioned midway between their planes. Of course, the distance between the two lenses must be less than the larger focal length.

Positioned in optical alignment with lenses 12 and 14 and located at the common focus is a field lens 17. Field lens 17, which is a positive lens, is held in place by means of a frusto conical housing 18 which is rigidly secured to the lens 12. A threaded cover 19 is also provided for securing the lens 12 within the housing 11.

Housing 11 is also provided with a peripheral flange 21 so that the device can be easily attached to the object whose angular movement is being measured.

As noted above, the focal lengths of the two lenses are different. Accordingly, the ratio of the focal length of these lenses will determine the amount of magnification or minification of the emerging beam of collimated light.

For example, if lens 12 has a focal length of 10 feet and lens 14 has a focal length of 2 feet, the ratio of the focal lengths of lens 12 to lens 14 is five to one. A collimated beam of light entering the lens 12 at an angle α of 7 seconds will be reflected by the surface 15, collected by the field lens 17 and emerge from the lens 14 at an angle β of 35 seconds. Similarly, a collimated beam of light entering lens 14 at an angle of 15 seconds will emerge from lens 12 at an angle of 3 seconds. If the collimated beam of light is sufficiently wide so that it enters both lens 12 and lens 14 at the same time, the light emerging therefrom will be a pair of collimated beams. One beam will be magnified in proportion to the ratio of the two focal lengths and the other beam will be minified in proportion to the ratio of the two focal lengths, corresponding to the order in which the two beams pass through the lens assembly. In order to insure that light transmitted from one of the lenses will pass through the other lens when reflected by the mirror 15, it is desirable that the focal value, or f/number, of these lenses be made equal.

Figure 2:
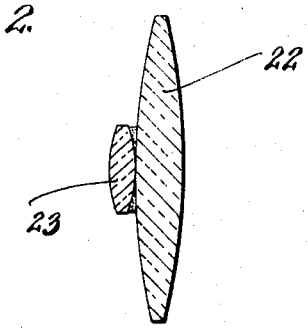
FIGURE 2 is a view in section of a portion of another embodiment.
Figure 3:
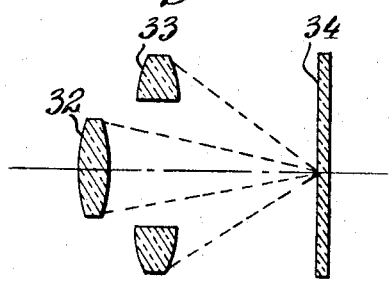
FIGURE 3 is an optical diagram of another embodiment of the invention.

The two lenses 12 and 14 need not be positioned so as to lie in the same plane as shown in FIGURE 1 but can be arranged so that they are in contact as shown in FIGURE 2. The equivalent focal length of two lenses in contact and can be readily determined by well known lens formulas. The mirror is spaced midway between the focal plane determined by lens 22 and the focal plane of the combination of lenses 22 and 23. The two lenses may even be arranged so that they are spaced apart from each other as shown in FIGURE 3. If the distance between lenses 32 and 33 is equal to the difference in their focal lengths the two lenses have a common focal plane. In this arrangement the mirror 34 is positioned at the common focal plane.

It should be noted that it is within the scope of this invention to provide for a system comprising only reflective optics, it only being necessary that each of the reflective elements have a different focal length and that the reflective elements be arranged so that they share a common focal plane. Similarly, it is within the scope of this invention to provide for a system having one refractive member such as a lens and one curved mirror or even a system of entirely refractive optics.

It should be understood, of course, that the foregoing disclosure relates to only preferred embodiments of the invention and that many alterations and modifications may be made therein without departing from the spirit and scope of the invention as set forth in the appended claims.

What is claimed is:
1. An optical reflector target comprising in fixed relationship:
   (a) a first positive lens,
   (b) a second positive lens in optical and axial alignment with said first positive lens,
   (c) said lenses having different focal lengths, and
   (d) a planar reflective surface located along the optical axis of said lenses in a plane normal to the optical axis of said lenses,
   (e) the optical path length from one of the lenses to the planar reflective surface to the other lens being equal to the sum of the focal lengths of the two lenses,
whereby a collimated beam of light entering one of the lenses at one angle to the optical axis will be reflected by the planar reflective surface to the other lens and emerge from said other lens at a proportionately different angle.

2. An optical target comprising in fixed relationship:
   (a) a plane mirror, and
   (b) a pair of optically and axially aligned positive powered optical components having different focal lengths located in front of said mirror,
   (c) said plane mirror lying in a plane perpendicular to the optical axis of said pair of optical components,
   (d) the optical path length from one of said optical components to the plane mirror to the other optical component being equal to the sum of the focal lengths of the two optical components,
whereby, a collimated beam of light received by one component at one angle to the optical axis of said components will be reflected by said mirror and emerge from said other optical component at a collimated beam of light at a proportionately different angle.

3. An optical target comprising in fixed relationship:
   (a) a first positive lens having an axial aperture extending from the front to the rear,
   (b) a second positive lens having a physical size smaller than the physical size of said first positive lens and in optical and axial alignment with said first positive lens,
   (c) said second positive lens having a focal length different from said positive lens, and
   (d) a plane mirror located behind both of said lenses along their optical axis and in a plane normal to said optical axis,
   (e) the optical path length from one of said lenses to the plane mirror to the other lens being equal to the sum of the focal lengths of the two lenses.

4. An optical target comprising in fixed relationship:
   (a) a first positive lens having an axial aperture extending from the front to the rear,
   (b) a second positive lens located within the aperture of said first positive lens and in optical and axial alignment with said first positive lens,
   (c) said second positive lens having a focal length different from said first positive lens, and
   (d) a plane mirror located behind both of said lenses along their optical axis and in a plane normal to said optical axis,
   (e) the optical path length from one of said lenses to the plane mirror to the other lens being equal to the sum of the focal lengths of the two lenses.

5. The invention according to claim 4 and further including a field lens in optical and axial alignment with said first and second lenses and positioned between said plane mirror and the lens having the smaller focal length at the focal plane of the lens having the smaller focal length.

6. The invention according to claim 4 and wherein said first and second positive lenses are located in the same plane.

References Cited

UNITED STATES PATENTS

| 1,549,579 | 8/1925 | Lenouvel _____ 350—45 |
| 2,944,783 | 7/1960 | MacLeish et al. _____ 350—16 X |
| 2,367,567 | 1/1945 | Darby. |
| 3,317,911 | 5/1967 | Stahler et al. _____ 350—202 |
| 3,349,664 | 10/1967 | Kohlenberger. |

DAVID SCHONBERG, *Primary Examiner.*

P. R. GILLIAM, *Assistant Examiner.*

U.S. Cl. X.R.

350—202, 213